(12) United States Patent
Kim

(10) Patent No.: US 9,892,838 B2
(45) Date of Patent: Feb. 13, 2018

(54) ELECTRONIC DEVICE WITH CURVED BOTTOM AND OPERATING METHOD THEREOF

(71) Applicant: Samsung Electronics Co., Ltd., Gyeonggi-do (KR)

(72) Inventor: Byung-Soo Kim, Gyeonggi-do (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 152 days.

(21) Appl. No.: 14/532,917

(22) Filed: Nov. 4, 2014

(65) Prior Publication Data

US 2015/0124367 A1    May 7, 2015

(30) Foreign Application Priority Data

Nov. 4, 2013  (KR) ........................ 10-2013-0133220

(51) Int. Cl.
| | |
|---|---|
| H01H 47/00 | (2006.01) |
| H01H 50/12 | (2006.01) |
| H01F 7/18 | (2006.01) |
| H04M 1/02 | (2006.01) |
| H01F 7/121 | (2006.01) |
| H01F 7/14 | (2006.01) |
| H04M 19/04 | (2006.01) |

(52) U.S. Cl.
CPC ........... *H01F 7/1844* (2013.01); *H01F 7/121* (2013.01); *H01F 7/14* (2013.01); *H04M 1/0202* (2013.01); *H04M 19/047* (2013.01); *H04M 2250/12* (2013.01)

(58) Field of Classification Search
CPC .......... H01F 7/1844; H01F 7/121; H01F 7/14

USPC ................................................ 361/234, 142
See application file for complete search history.

(56) References Cited

U.S. PATENT DOCUMENTS

| | | | |
|---|---|---|---|
| 6,304,170 B1 | 10/2001 | Armstrong et al. | |
| 7,696,655 B2* | 4/2010 | Shishido .............. | G11B 17/028 310/51 |
| 2003/0144034 A1* | 7/2003 | Hack ................... | H04M 1/0208 455/566 |
| 2010/0007510 A1* | 1/2010 | Ina ...................... | H04M 1/0202 340/815.83 |
| 2012/0024648 A1* | 2/2012 | Liu ..................... | H04M 1/0202 188/378 |
| 2012/0225264 A1 | 9/2012 | Villwock | |

FOREIGN PATENT DOCUMENTS

| | | |
|---|---|---|
| EP | 0999530 A2 | 5/2000 |
| FR | 2968489 A1 | 6/2012 |

OTHER PUBLICATIONS

Extended European Search Report dated May 13, 2015 in connection with European Patent Application No. 14191690.8; 8 pages.
Foreign Communication from Related Couterpart Application; European Patent Application No. 14191690.8; Communication Pursuant to Article 94(3) EPC dated Oct. 30, 2017; 5 pages.

* cited by examiner

*Primary Examiner* — Thienvu Tran
*Assistant Examiner* — Lucy Thomas

(57) ABSTRACT

An electronic device includes a housing forming an exterior of the electronic device and rockable using a curved bottom, a movable object movable in the housing, a transfer means for moving the movable object to at least one eccentric location, and a control means for controlling the transfer means. Various other implementations are also possible.

16 Claims, 17 Drawing Sheets

ELECTRONIC DEVICE WITH CURVED BOTTOM AND OPERATING METHOD THEREOF

PRIORITY

The present application is related to and claims the benefit under 35 U.S.C. § 119(a) of a Korean patent application filed in the Korean Intellectual Property Office on Nov. 4, 2013 and assigned Serial No. 10-2013-0133220, the entire disclosure of which is hereby incorporated by reference.

TECHNICAL FIELD

The present disclosure relates to an electronic device with a curved bottom and an operating method thereof.

BACKGROUND

With the development of electronics communication industries in recent years, a user device (e.g., a cellular phone, an electronic organizer, a personal data assistant, a laptop computer, etc.) has become necessities of modern life as an important means for delivering information which changes rapidly. The user device facilitates a user's operation through a Graphic User Interface (GUI) environment using a touch screen, and provides various multimedia based on a web environment.

In addition, the user device includes various electronic components to provide various functions. For example, a stereo speaker module is equipped in the user device to provide a music listening function using a stereo sound. A camera module may be equipped in the user device to provide a photographing function. A communication module may be equipped in the user device to provide a communication function with another electronic device through a network.

SUMMARY

To address the above-discussed deficiencies, it is a primary object to provide an electronic device which is rockable using a curved bottom and an operating method thereof.

In accordance with the present disclosure, an electronic device is provided. The electronic device includes a housing forming an exterior of the electronic device and rockable using a curved bottom, a moving object movable in the housing, a transfer means for moving the moving object to at least one eccentric location, and a control means for controlling the transfer means.

In accordance with the present disclosure, a method of operating an electronic device having a movable moving object and a curved bottom is provided. The method includes sensing at least one event, and controlling the moving object for triggering a rocking of the electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
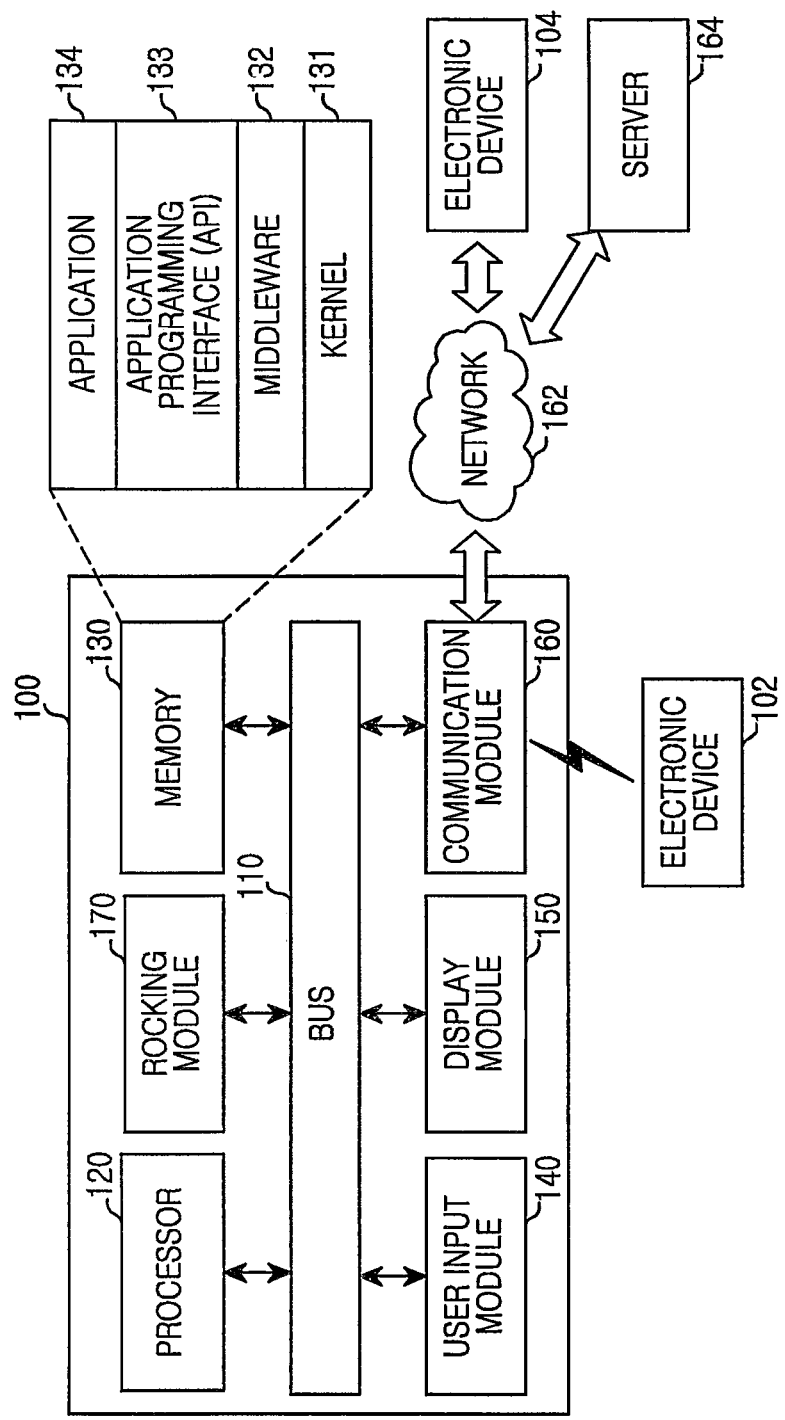
FIG. 1 illustrates a block diagram of an electronic device according to various embodiments of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. The following description with reference to the accompanying drawings is provided to assist in a comprehensive understanding of embodiments of the disclosure as defined by the claims and their equivalents. It includes various specific details to assist in that understanding but these are to be regarded as merely examples. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to their dictionary meanings, but, are merely used to enable a clear and consistent understanding of the disclosure. Accordingly, it should be apparent to those skilled in the art that the following description of embodiments of the present disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An electronic device according to various embodiments of the present disclosure can be a device including a communication function. For example, the electronic device can include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a MPEG-1 Audio Layer 3 (MP3) player, a mobile medical device, a camera, and a wearable device (e.g., a Head-Mounted-Device (HMD) such as electronic glasses, electronic clothes, an electronic bracelet, an electronic necklace, an electronic appcessory, an electronic tattoo, or a smart watch).

According to certain embodiments, the electronic device may be a smart home appliance having a communication function. For example, the smart home appliance may include at least one of a TeleVision (TV), a Digital Video Disk (DVD) player, an audio, a refrigerator, an air conditioner, a cleaner, an oven, a microwave oven, a washing machine, an air purifier, a set-top box, a TV box (e.g., Samsung HomeSync™, Apple TV™, or Google TV™), a game console, an electronic dictionary, an electronic key, a camcorder, and an electronic picture frame.

According to certain embodiments, the electronic device may include at least one of various medical devices (e.g., Magnetic Resonance Angiography (MRA), Magnetic Resonance Imaging (MRI), Computed Tomography (CT), imaging equipment, ultrasonic instrument, etc.), a navigation device, a Global Positioning System (GPS) receiver, an Event Data Recorder (EDR), a Flight Data Recorder (FDR), a car infotainment device, an electronic equipment for ship (e.g., a vessel navigation device, a gyro compass, etc.), avionics, a security device, and an industrial or domestic robot.

According to certain embodiments, the electronic device may include at least one of a furniture or a part of building/constructions including a communication function, an electronic board, an electronic signature receiving device, a projector, and various measurement machines (e.g., water supply, electricity, gas, propagation measurement machine, etc.). The electronic device according to various embodiments of the present disclosure may be one or more combinations of the aforementioned various devices. In addition, it is apparent those ordinarily skilled in the art that the electronic device according to various embodiments of the present disclosure is not limited to the aforementioned devices.

FIG. 1 illustrates a block diagram of an electronic device according to various embodiments of the present disclosure.

Referring to FIG. 1, an electronic device 100 includes a bus 110, a processor 120, a memory 130, a user input module 140, a display module 150, a communication module 160, or a rocking module 170.

The bus 110 can be a circuit for connecting the aforementioned elements to each other and for delivering a communication (e.g., a control message) between the aforementioned elements.

The processor 120 can receive an instruction from the aforementioned different elements (e.g., the memory 130, the user input module 140, the display 150, the communication interface 160, or the rocking module 170), for example, via the bus 110, and thus can interpret the received instruction and execute arithmetic or data processing according to the interpreted instruction.

The memory 130 can store an instruction or data received from the processor 120 or different elements (e.g., the user input module 140, the display 150, the communication interface 160, or the rocking module 170) or generated by the processor 120 or the different elements. The memory 130 can include programming modules such as a kernel 131, a middleware 132, an Application Programming Interface (API) 133, an application 134, and the like. Each of the aforementioned programming modules can consist of software, firmware, or hardware entities or can consist of at least two or more combinations thereof.

The kernel 131 can control or manage the remaining other programming modules, for example, system resources (e.g., the bus 110, the processor 120, the memory 130, etc.) used to execute an operation or function implemented in the middleware 132, the API 133, or the application 134. The kernel 131 can provide a controllable or manageable interface by accessing individual elements of the electronic device 100 in the middleware 132, the API 133, or the application 134.

The middleware 132 can perform a mediation role so that the API 133 or the application 134 communicates with the kernel 131 to exchange data. Regarding task requests received from the (plurality of) applications 134, the middleware 132 can perform load balancing for the task request by using a method of assigning a priority and the like capable of using a system resource (e.g., the bus 110, the processor 120, the memory 130, etc.) of the electronic device 100 to at least one application among the (plurality of) applications 134.

The API 133 includes at least one interface or function for file control, window control, video processing, or character control, and the like, as an interface capable of controlling a function provided by the application 134 in the kernel 131 or the middleware 132.

The user input module 140 receives an instruction or data from a user and delivers it to the processor 120 or the memory 130 via the bus 110.

The display module 150 displays video, image, data, and the like, to the user.

The communication module 160 connects a communication between another electronic device 102 and the electronic device 100. The communication module 160 connects a communication between a server 164 and the electronic device 102. The communication module 160 supports a specific near-field communication protocol (e.g., Wireless Fidelity (WiFi), Bluetooth (BT), Near Field Communication (NFC), or specific network communication 162 (e.g., Internet, Local Area Network (LAN), Wide Area Network (WAN), telecommunication network, cellular network, satellite network, Plain Old Telephone Service (POTS), etc.). Each of the electronic devices 102 and 104 can be a device which is the same (e.g., the same type) as the electronic device 100 or can be a different (e.g., a different type) device.

The rocking module 170 allows the electronic device 100 to be rockable. For example, the rocking module 170 generates an eccentric moment, and the electronic device 100 can be rocked by using a curved bottom. The rocking module 170 generates the eccentric moment in such a manner that a moving object is moved to an eccentric location.

Figure 2:
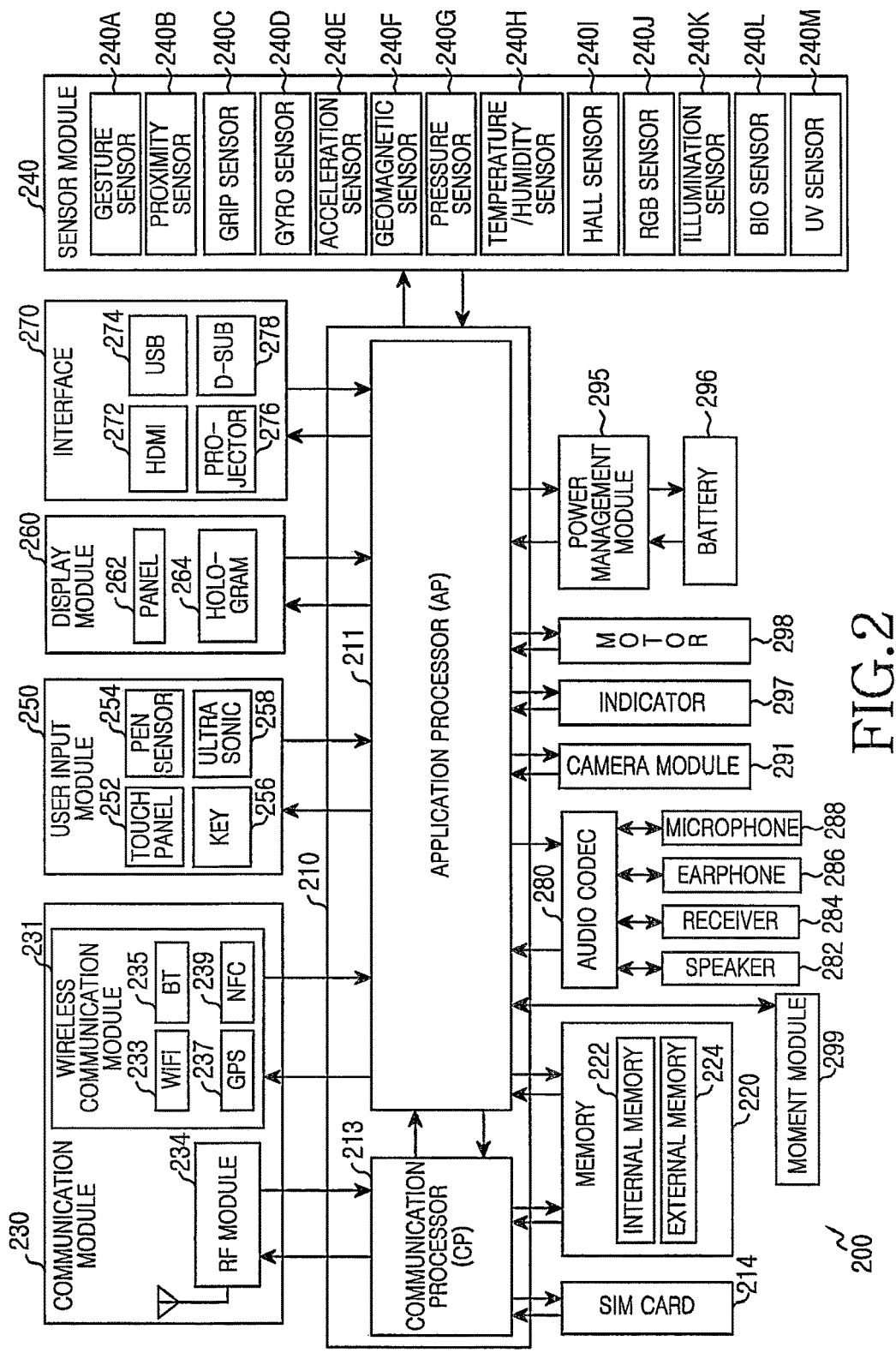
FIG. 2 illustrates a block diagram of a hardware structure according to various embodiments of the present disclosure.

FIG. 2 illustrates a block diagram of a hardware structure according to various embodiments of the present disclosure.

Referring to FIG. 2, a hardware structure 200 includes one or more processors 210, a Subscriber Identification Module (SIM) card 214, a memory 220, a communication module 230, a sensor module 240, a user input module 250, a display module 260, an interface 270, an audio codec 280, a camera module 291, a power management module 295, a battery 296, an indicator 297, a motor 298, or a moment module 299.

The processors 210 include one or more Application Processors (APs) 211 or one or more Communication Processors (CPs) 213. Although it is described in FIG. 2 that the AP 211 and the CP 213 are included in the processor 210, the AP 211 and the CP 213 can be respectively included in different Integrated Circuit (IC) packages. The AP 211 and the CP 213 can be included in one IC package.

The AP 211 controls a plurality of hardware or software elements connected to the AP 211 by driving an operating system or an application program, and performs a variety of data processing and computation including multimedia data. The AP 211 can be implemented with a System on Chip (SoC). The processor 210 can further include a Graphic Processing Unit (GPU) (not shown).

The CP 213 manages a data link and converting a communication protocol in a communication between other hardware entities connected with the hardware 200 through a network. The CP 213 may be implemented with an SoC. The CP 213 performs at least a part of a multimedia control function. The CP 213 identifies and authenticates a terminal in a communication network by using a Subscriber Identification Module (SIM) (e.g., the SIM card 214). The CP 213 provides the user with services such as voice telephony, video telephony, text messages, packet data, and the like.

The CP 213 controls data transmission/reception of the communication module 230. Although it is illustrated in FIG. 2 that the elements such as the CP 213, the power management module 295, the memory 220, and the like, are separate elements independent of the AP 211, the AP 211 can be implemented to include at least a part (e.g., the CP 213) of the aforementioned elements.

The AP 211 or the CP 213 loads an instruction or data, received from a non-volatile memory connected thereto or at least one of other elements, to a volatile memory and then processes the instruction or data. The AP 211 or the CP 213 can store data, received from the at least one of other elements or generated by the at least one of other elements, into the non-volatile memory.

The SIM card 214 can be a card in which a SIM is implemented, and can be inserted to a slot formed at a specific location of the electronic device. The SIM card 214 includes unique identification information (e.g., an Integrated Circuit Card Identifier (ICCID)) or subscriber information (e.g., an International Mobile Subscriber Identity (IMSI)).

The memory 220 can include an internal memory 222 or an external memory 224. The internal memory 222 includes at least one of a volatile memory (e.g., a Dynamic RAM (DRAM), a Static RAM (SRAM), a Synchronous Dynamic RAM (SDRAM), etc.) or a non-volatile memory (e.g., a One Time Programmable ROM (OTPROM), a Programmable ROM (PROM), an Erasable and Programmable ROM (EPROM), an Electrically Erasable and Programmable ROM (EEPROM), a Mask ROM, a Flash ROM, a NAND flash memory, a NOR flash memory, etc.). The internal memory 222 can have a form of a Solid State Drive (SSD). The external memory 224 can further include Compact Flash (CF), Secure Digital (SD), Micro Secure Digital (Micro-SD), Mini Secure Digital (Mini-SD), extreme Digital (xD), memory stick, and the like.

The communication module 230 includes a wireless communication module 231 or a Radio Frequency (RF) module 234. The wireless communication module 231 can include a WiFi 233, a BlueTooth (BT) 235, a Global Positioning System (GPS) 237, or a Near Field Communication (NFC) 239. For example, the wireless communication module 231 can provide a wireless communication function by using a radio frequency. Additionally or alternatively, the wireless communication module 231 can include a network interface (e.g., a LAN card), modem, and the like for connecting the hardware 200 to a network (e.g., Internet, LAN, WAN, telecommunication network, cellular network, satellite network, POTS, etc.).

The RF module 234 can serve to transmit/receive data, for example, an RF signal or a paged electronic signal. Although not shown, the RF module 234 can include a transceiver, a Power Amp Module (PAM), a frequency filter, a Low Noise Amplifier (LNA), and the like. In addition, the RF module 234 can include a component (e.g., a conductor), a conducting wire, and the like, for transmitting/receiving a radio wave on a free space in a wireless communication.

The sensor module 240 may include at least one of a gesture sensor 240A, a proximity sensor 240B, a grip sensor 240C, a gyro sensor 240D, an acceleration sensor 240E, a geomagnetic sensor 240F, a pressure sensor 240G, a temperature/humidity sensor 240H, a hall sensor 240I, a Red, Green, Blue (RGB) sensor 240J, an illumination sensor 240K, a bio sensor 240L, and an Ultra Violet (UV) sensor 240M. The sensor module 240 measures a physical quantity or detect an operation state of the hardware, and thus can convert the measured or detected information into an electric signal. Additionally or alternatively, the sensor module 240 can include an E-node sensor (not shown), an ElectroMyo-Graphy (EMG) sensor (not shown), an ElectroEncephalo-Gram (EEG) sensor (not shown), an ElectroCardioGram (ECG) sensor (not shown), a fingerprint sensor, and the like. The sensor module 240 includes a control circuit for controlling at least one or more sensors included therein.

The user input module 250 includes a touch panel 252, a (digital) pen sensor 254 (e.g., a digitizer), a key 256, or an ultrasonic input unit 258. The touch panel 252 can recognize a touch input by using at least one of an electrostatic type, a pressure-sensitive type, an infrared type, and an ultrasonic type. In addition, the touch panel 252 includes a controller (not shown). In case of the electrostatic type, not only direct touch but also proximity recognition is also possible. The touch penal 252 includes a tactile layer. Herein, the touch panel 252 provides the user with a tactile reaction.

The (digital) pen sensor 254 can be implemented by using the same or similar method of receiving a user input (i.e., an electrostatic type, a pressure-sensitive type, an infrared type, and an ultrasonic type) or by using an additional sheet for recognition. The key 256 can be a keypad or a touch key. The ultrasonic input unit 258 is a device by which a terminal detects a sound wave through a microphone by using a pen which generates an ultrasonic signal, and is a device capable of radio recognition. The hardware 200 uses the communication module 230 to receive a user input from an external device (e.g., a network, a computer, or a server) connected thereto.

The display module 260 includes a panel 262 or a hologram 264. The panel 262 can be a Liquid-Crystal Display (LCD), an Active-Matrix Organic Light-Emitting Diode (AM-OLED), and the like. The panel 262 can be implemented in a flexible, transparent, or wearable manner. The panel 262 can be constructed as one module with the touch panel 252. The hologram 264 can use an interference of light and show a stereoscopic image in the air. The display module 260 can further include a control circuit for controlling the panel 262 or the hologram 264.

The interface 270 includes a High-Definition Multimedia Interface (HDMI) 272, a Universal Serial Bus (USB) 274, a projector 276, or a D-subminiature (D-sub) 278. Additionally or alternatively, the interface 270 includes Secure Digital (SD)/Multi-Media Card (MMC) (not shown) or Infrared Data Association (IrDA) (not shown).

The audio codec 280 can bilaterally convert a voice and electronic signal. The audio codec 280 converts audio information which is input or output through a speaker 282, a receiver 284, an earphone 286, a mike 288, and the like.

The camera module 291 is a device for image and video capturing, and according to one embodiment, includes one or more image sensors (e.g., a front lens or a rear lens), an Image Signal Processor (ISP) (not shown), or a flash Light Emitting Diode (LED) (not shown).

The power management module 295 manages power of the hardware 200. Although not shown, the power management module 295 may include a Power Management Integrated Circuit (PMIC), a charger Integrated Circuit (IC), or a battery fuel gauge.

The PMIC may be equipped inside an IC or SoC semiconductor. Charging may be classified into wired charging and wireless charging. The charger IC may charge a battery, and may avoid over-voltage or over-current flowing from a charger. The charger IC may further include a charger IC for at least one of the wired charging and the wireless charging. The wireless charging may be classified into a magnetic resonance type, a magnetic induction type, and an electromagnetic type. An additional circuit for the wireless charging may be added, such as a coil loop, a resonant circuit, a rectifier, and the like.

The battery gauge may measure a residual quantity of the battery 296 and a voltage, current, and temperature during charging. The battery 296 may generate electricity to supply power source, and may be a rechargeable battery.

The indicator 297 may indicate a specific state, e.g., a booting state, a message state, a charging state, and the like, of the hardware 200 or a part thereof (e.g., the AP 211).

The motor 298 converts an electric signal into a mechanical vibration. A Micro Control Unit (MCU, not shown) controls the sensor module 240.

The moment module 299 may move a moving object to at least one eccentric location in response to an electric signal. The moving object applies a load at the at least one eccentric location, and the electronic device 200 can be rocked using a curved bottom due to an eccentric moment caused by the rocking.

Although not shown, the hardware 200 may include a processing unit (e.g., a GPU) for supporting a mobile TV. The processing unit for supporting the mobile TV can process media data according to a protocol of, for example, Digital Multimedia Broadcasting (DMB), Digital Video Broadcasting (DVB), media flow, and the like.

Names of the aforementioned elements of the hardware according to one embodiment may vary depending on a type of electronic device. The hardware of one embodiment may include at least one of the aforementioned elements. Some of the elements may be omitted, or additional other elements may be further included. In addition, some of the elements of the hardware of one embodiment may be combined and constructed as one entity, so as to equally perform functions of corresponding elements before combination.

Figure 3:
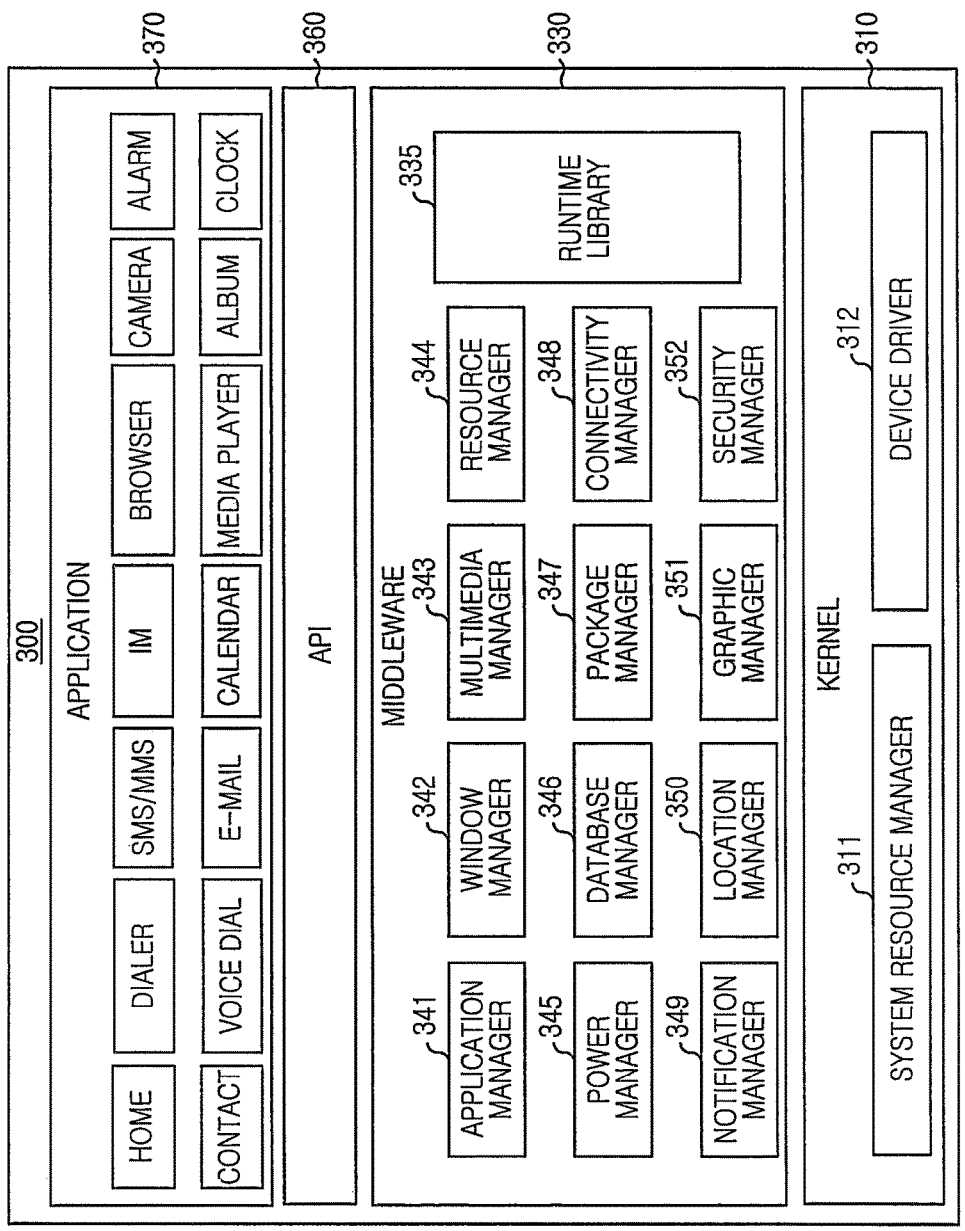
FIG. 3 illustrates a block diagram of a programming module according to various embodiments of the present disclosure.

FIG. 3 is a block diagram of a programming module according to various embodiments of the present disclosure. A programming module 300 can be included (e.g., stored) in the electronic device 100 (e.g., the memory 130) of FIG. 1. At least some parts of the programming module 300 can consist of software, firmware, hardware, or a combination of at least two or more of them. The programming module 300 includes an Operating System (OS) implemented in a hardware (e.g., the hardware 200) and controlling a resource related to an electronic device (e.g., the electronic device 100) or various applications (e.g., an application 370) driven on the OS. For example, the OS can be Android, iOS, Windows, Symbian, Tizen, Bada, and the like.

Referring to FIG. 3, the programming module 300 includes a kernel 310, a middleware 330, an Application Programming Interface (API) 360, or the application 370.

The kernel 310 (e.g., the kernel 631) includes a system resource manager 311 or a device driver 312. The system resource manager 311 includes a process managing unit, a memory managing unit, a file system managing unit, and the like. The system resource manager 311 performs control, allocation, retrieval, and the like of the system resource. The device driver 312 includes a display driver, a camera driver, a Bluetooth driver, a shared memory driver, a USB driver, a keypad driver, a WiFi driver, or an audio driver. The device driver 312 includes an Inter-Process Communication (IPC) driver (not shown).

The middleware 330 includes a plurality of modules pre-implemented to provide a function commonly required by the application 370. The middleware 330 may provide a function through the API 360 so that the application 370 can effectively use a limited system resource in the electronic device. For example, as shown in FIG. 3, the middleware 330 (e.g., the middleware 632) includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 includes a library module used by a compiler to add a new function through a programming language while the application 370 is executed. The runtime library 335 performs an operation of an input/output, a memory management, an arithmetic function, and the like.

The application manager 341 manages a life cycle of at least one application among the applications 370. The window manager 342 manages a Graphic User Interface (GUI) resource used in a screen. The multimedia manager 343 can recognize a format required to reproduce various media files, and can use a code suitable for the format to perform encoding or decoding of the media file. The resource manager 344 can manage a resource (e.g., a source code, a memory, a storage space, etc.) of at least any one of the applications 370.

The power manager 345 can manage a battery or power by operating together with a Basic Input/Output System (BIOS), and the like, and can provide power information, and the like, required for the operation. The database manager 346 can manage to generate, search, or change a database to be used in at least one application among the applications 370. The package manager 347 can manage an installation or update of an application distributed in a form of a package file.

The connectivity manager 348 manages a wireless connection such as WiFi, Bluetooth, and the like. The notification manager 349 displays or notifies an event such as an incoming message, an appointment, a proximity notification, and the like, in a manner of not disturbing the user. The location manager 350 manages location information of the electronic device. The graphic manager 351 manages a graphic effect to be provided to the user or a user interface related thereto. The security manager 352 provides a general security function required for system security, user authentication, and the like. If the electronic device (e.g., the electronic device 100) has a telephone function, the middleware 330 further includes a telephony manager (not shown) for managing a voice or video telephony function of the electronic device.

The middleware 330 generates and uses a new middleware module by combining various functions of the aforementioned internal element modules. The middleware 330 provides a module specified for each type of operating system to provide a differentiated function. The middleware 330 dynamically deletes some of the existing elements or adds new elements. Some of the elements described in the various embodiments of the present disclosure may be omitted, or other elements may be further included or may be replaced with elements having other names for performing a similar function.

The API 360 (e.g., the API 133) is a set of API programming functions, and can be provided with other configurations according to an operating system. For example, in case of Android or IOS, one API set can be provided for each platform, and in case of Tizen, two or more API sets can be provided.

The application 370 (e.g., the application 134) can include a preloaded application or a third party application.

At least some parts of the programming module 300 are implemented with an instruction stored in a computer-readable storage media. If it is executed by one or more processors (e.g., the processor 210), one or more processors perform a function corresponding to the instruction. The computer-readable storage media can be the memory 260. At least some parts of the programming module 300 are implemented (e.g., executed) by the processor 210. At least some parts of the programming module 300 include modules, programs, routines, sets of instructions, processes, and the like, for performing one or more functions.

Names of elements of the programming module (e.g., the programming module 300) according to various embodiments of the present disclosure vary depending on a type of operating system. The programming module according to various embodiments of the present disclosure further include at least one or more elements among the aforementioned elements, or some of them may be omitted, or additional other elements can be further included.

Figure 4:
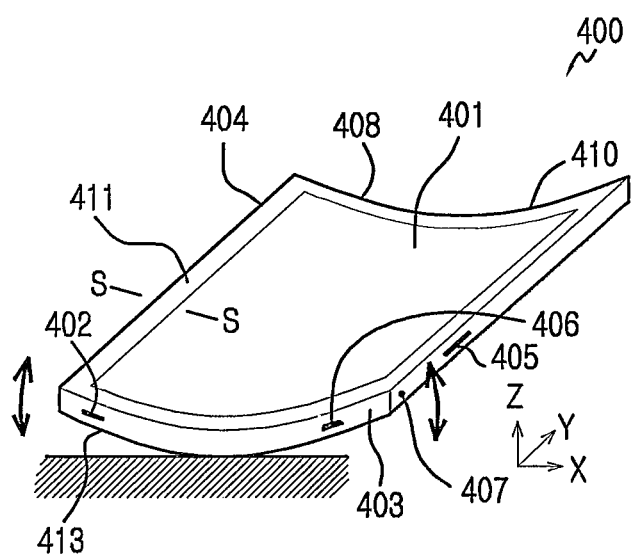
FIG. 4 illustrates a perspective view of an electronic device according to various embodiments of the present disclosure.

FIG. 4 illustrates a perspective view of an electronic device according to various embodiments of the present disclosure. An electronic device 400 can be the hardware 200 of FIG. 2. The electronic device 400 includes a housing 410 which forms an exterior and which can contain a plurality of electronic components. The housing 410 includes a curved bottom 413, and the electronic device 400 may perform a rolling motion by using the curved bottom 413 of the housing 410. The electronic device 400 may be tilted to any one side (e.g., front, rear, left, or right) in case of performing the rolling motion. The electronic device 400 can move while rotating in case of performing the rolling motion. As illustrated, the electronic device 400 is rockable to the left or right by using the rolling motion. Although not shown, the electronic device 400 may include the curved bottom used when it is rocked in the front/rear direction. An upper portion 411 of the housing 410 may include a downward concave curve. A touch screen 401 may be disposed to the upper portion 411 of the housing 410, and may have a curvilinear shape.

Referring to FIG. 4, the electronic device 400 includes the touch screen 401, a speaker 402, at least one sensor 403, a camera 404, at least one key 405, an external port 406, a microphone 407, and a jack 408.

The touch screen 401 displays an image, and can receive a touch input. The touch screen 401 includes a display and a touch panel.

The speaker 402 can output an electric signal as a sound.

The at least one sensor 403 (e.g., the sensor module 240) measures a physical quantity or detects an operation state of the electronic device 400, and thus converts the measured or detected information into an electric signal. The at least one sensor 403 may be placed to a specific location. The at least one sensor 403 may include at least one of a gesture sensor, a proximity sensor, a grip sensor, a gyro sensor, an acceleration sensor, a geomagnetic sensor, a pressure sensor, a temperature/humidity sensor, a hall sensor, an RGB sensor, an illumination sensor, a bio sensor, and a UV sensor.

The camera 404 (e.g., the camera module 291) is a device for image and video capturing, and includes one or more image sensors, an Image Signal Processor (ISP) (not shown), or a flash Light Emitting Diode (LED) (not shown).

The key 405 (e.g., the key 256) includes a press key or a touch key. The key 405 includes a volume control key or a power on/off key.

The external port 406 (e.g., the interface 270) can be used as a port for connecting with a High-Definition Multimedia Interface (HDMI) cable, a Universal Serial Bus (USB) cable, and a D-subminiature (D-sub) cable or as a charging port.

The microphone 407 (e.g., the mike 288) may convert a sound into an electric signal.

The jack 408 electrically connects a plug such as an earphone (e.g., the earphone 286), an ear set, and the like. The jack 408 can be hidden by a cover when unused.

Figure 5:
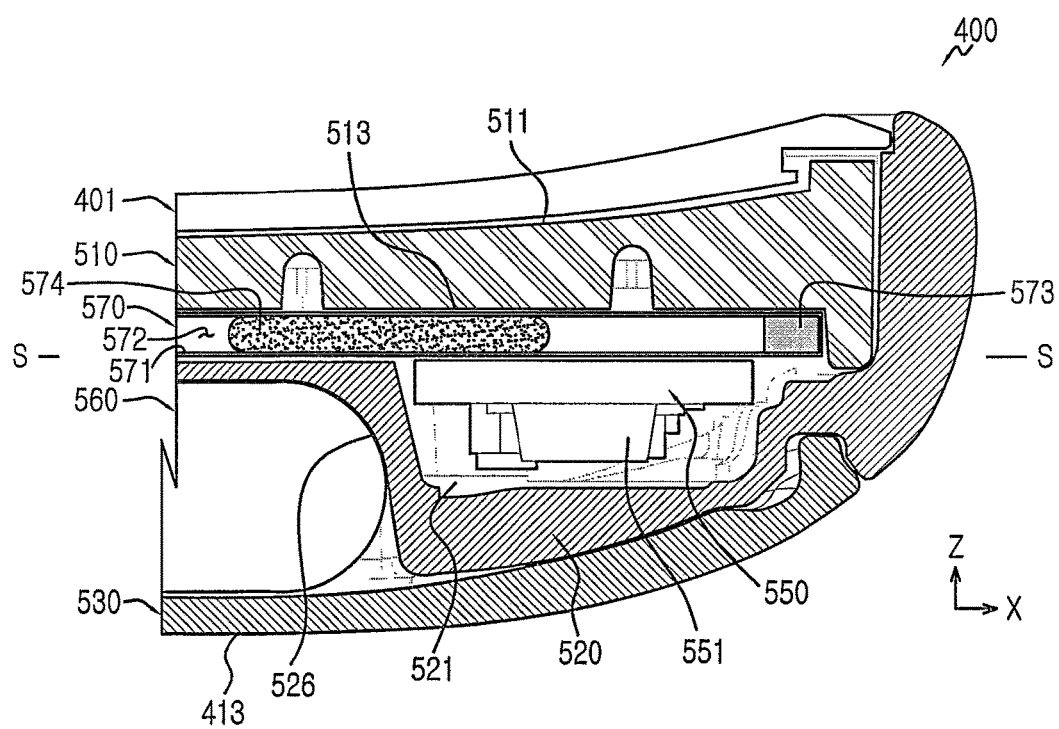
FIG. 5 illustrates a partial cross-sectional view, taken along a line S-S, of the electronic device of FIG. 4 according to various embodiments of the present disclosure.

FIG. 5 illustrates a partial cross-sectional view, taken along the line S-S, of the electronic device of FIG. 4 according to various embodiments of the present disclosure.

Referring to FIG. 5, the electronic device 400 includes a bracket 510, a rear case 520, a battery cover 530, the touch screen 401, a main circuit board 550, a battery 560, or a moment module 570.

The bracket 510 can be a mounting plate (or an installing plate) capable of installing a plurality of electronic components. The bracket 510 can be molded with a non-metallic or metallic material. The bracket 510 can be a frame capable of fixing or supporting a plurality of electronic components (e.g., the touch screen 401, the speaker 402, the at least one sensor 403, the camera 404, the at least one key 405, the external port 406, the microphone 407, or the jack 408). The bracket 510 mounts the electronic components including a Printed Circuit Board (PCB). The bracket 510 mounts the electronic components connected by an electrical connection element (e.g., a cable, a Flexible Printed Circuit Board (FPCB), etc.). The bracket 510 includes an upper groove 511 capable of mounting the touch screen 401. The upper groove 511 of the bracket 510 includes a curvilinear surface capable of mounting the curved touch screen 401. The bracket 510 includes a lower groove 513 capable of mounting the main circuit board 550 and the moment module 570 at a lower portion thereof. The bracket 510 includes a metal member (e.g., a metal coating member) electrically connectable with a ground of the main circuit board 550.

The rear case 520 may be connected (e.g., snap-fit engaged or bolt-engaged) with the bracket 510. In addition, in various embodiments, the rear case 520 may be present in an integral form, instead of being present as a piece separated from the battery cover 530. The rear case 520 may hide a plurality of components (e.g., the main circuit board 550) fixed on the bracket 510. The bracket 510, the rear case 520, and the main circuit board 550 may be connected together in a bolt-engagement manner. The rear case 520 may include a component containing groove 521 capable of containing electronic components 551 protruding downwardly from the main circuit board 550. The rear case 520 may include a battery containing groove 526 capable of containing the battery 560. The battery containing groove 526 may have a shape of a container which is open in a down direction. The battery 560 may be disposed to a space between the rear case 520 and the battery cover 530. The battery 560 may have a curvilinear shape.

The battery cover 530 may be easily detached from the rear case 520. The battery cover 530 may include a plurality of hooks (not shown) that can be engaged to a plurality of hook engaging grooves of the rear case 520 at a boundary of the rear case. The battery cover 530 may form the curved bottom 413 of the electronic device 400. The electronic device 400 may perform a rolling motion by using the curved bottom 413 of the battery cover 520. The electronic device 400 may be rocked by using the curved bottom 413 of the battery cover 520. When all of the bracket 510, the rear case 520, and the battery cover 530 are joined together, the bracket 510 may not be exposed, a part of the rear case 520 may form a lateral side of the electronic device 400, and the battery cover 430 may form the curved bottom 413 of the electronic device 400.

The touch screen 401 may be disposed to an upper portion of the bracket 510. The touch screen 401 may have a downward concave curve. The touch screen 401 may be electrically connected with the main circuit board 550 and may display a signal from the main circuit board 500 as an image. The touch screen 401 may include a window, a touch panel, and a display panel which are not shown. The window may be transparent, and may be disposed above the touch panel. An image from the display panel (e.g., the panel 262) can be seen through the window when viewed from outside of the display panel. The touch panel (e.g., the touch panel 252) may be disposed to a lower portion of the window, and may recognize a touch input. The touch panel may apply at least one of an electrostatic type, a pressure-sensitive type, an infrared type, and an ultrasonic type. The main circuit board 550 may receive the touch input from the touch panel. The display panel (e.g., the panel 262) may be disposed to a lower portion of the touch panel. The display panel may display a signal transmitted from the main circuit board 550 as an image. The display panel may be a Liquid-Crystal Display (LCD), an Active-Matrix Organic Light-Emitting Diode (AM-OLED), and the like. The display panel may be implemented in a flexible manner. The display panel may be a flexible wraparound display panel. The display panel may include an e-paper. The display panel may be constructed as one module together with the touch panel. The display panel may be constructed as one module together with the window and the touch panel.

The main circuit board 550 (e.g., the main board or mother board) may be disposed to a lower portion of the bracket 510. At least a part of the main circuit board 550 may be disposed between the bracket 510 and the rear case 520. The main circuit board 550 is a board having a basic circuitry and a plurality of electronic components mounted thereon. The main circuit board 550 may configure an execution environment of the electronic device 400, maintain information thereof, allow the electronic device 400 to be driven reliably, and allow all devices of the electronic device 400 to smoothly exchange data inputs/outputs. The main circuit board 550 may be joined to a lower portion of the bracket 510 by using an engaging mechanism such as a bolt and the like. At least a part of the main circuit board 550 may have a curved shape of the electronic device 400.

At least a part of the moment module 570 may be disposed between the bracket 510 and the rear case 520. At least the part of the moment module 570 may also be disposed between the bracket 510 and the main circuit board 550. The moment module 570 may include a duct 571, at least one electromagnet 573, and a magnet material 574.

The duct 571 includes a passage 572 for guiding a movement of the magnetic material 574. The passage 572 may have a long linear shape, and the magnetic material 574 may move linearly. Although not shown, the passage 572 has a downward concave shape, and the magnetic material 574 can move in a curvilinear manner. A cross-section of the passage 572 orthogonal to a movement direction of the magnetic material 574 can have various shapes such as a circular shape, an elliptical shape, a rectangular shape, and the like.

The at least one electromagnet 573 may be disposed to an end of the passage 572. Although not shown, a pair of electromagnets 573 may be disposed to at both ends of the passage 572. In addition, the pair of electromagnets 573 may be disposed at eccentric locations at both sides from a rocking center of the electronic device 400. Herein, if the electronic device 400 is placed in a horizontal floor in a reliable state without having an eccentric load exerted thereon, the 'rocking center' may indicate a portion in which the curved bottom 413 of the electronic device 400 is in contact with the horizontal floor.

The at least one electromagnet 573 may generate an electromagnetic force by receiving a control signal (e.g., an electric current) input from the main circuit board 550. The at least one electromagnet 573 may be electrically connected with the main circuit board 550 by means of an electrical connection element (e.g., a C-clip, a cable, etc.) (not shown). A direction of the electromagnetic force of the at least one electromagnet 573 may be determined according to the control signal from the main circuit board 550. According to the direction of the electromagnetic force, an attractive or repulsive force may act between the at least one electromagnet 573 and the magnetic material 574. In addition, a strength of the electromagnetic force of the at least one electromagnet 573 may be determined according to the control signal from the main circuit board 550. For example, the at least one electromagnet 573 may generate an electromagnetic force in such a manner that the greater the electric current strength, the greater the strength of the electromagnetic force. A size of the attractive force or repulsive force between the electromagnet 573 and the magnetic material 574 may be in proportion to the strength of the electromagnetic force. An increase in the strength of the electromagnetic force corresponds to faster movement of the magnetic material 574 towards the electromagnet 573 or escape from the electromagnet 573.

The main circuit board 550 can apply an electric current in an alternate manner to the pair of electromagnets 573 disposed at both sides of the passage 572. The magnetic material 574 moves reciprocally. Due to the reciprocal movement of the magnetic material 574, the electronic device 400 maintains a desired rocking. For example, if the electric current is applied to a left electromagnet (not shown), the magnetic material 574 may move to a left eccentric location. The electronic device 400 may perform a rolling motion to the left due to a left eccentric load, and thereafter may perform a rolling motion to the right due to a conversion from a potential energy to a kinetic energy. The electronic device 400 is rocked through a process of alternating between the left rolling motion and the right rolling motion, and such a rocking motion may be dissipated due to a surrounding factor (e.g., a friction, etc.). However, in a state where the electronic device 400 completes the left rolling motion, if the magnetic material 574 moves to the right eccentric location, the electronic device 400 may strongly perform a right rolling motion due to a right eccentric load which is additionally applied. The main circuit board 550 may control a movement of the magnetic material 574 according to the rolling motion state of the electronic device 400, and may maintain desired rocking states. For example, the main circuit board 550 may output a control signal for controlling the eccentric location of the magnetic material 574 to at least one electromagnet 573 according to the rolling motion state of the electronic device 400. The main circuit board 550 may output a control signal for controlling a speed of the magnetic material 574 to the at least one electromagnet 573 according to the rolling motion state of the electronic device 400. At least one sensor (e.g., the sensor module 240) may acquire motion data regarding the rolling motion, and may output a control signal to the at least one electromagnet 573 in response to motion data (e.g., a rotation direction, a rotation angle, a rotation speed, a movement distance, a time, an angular speed, etc.). The control signal controls a direction of an electromagnetic force, a strength of the electromagnetic force, or a time of keeping the electromagnetic force in the at least one electromagnet 573. According to such a control signal, the electronic device 400 can be rocked regularly, instead of being rocked excessively or insufficiently.

FIG. 6 illustrates a structure of a moment module according to various embodiments of the present disclosure.

Figure 6A:
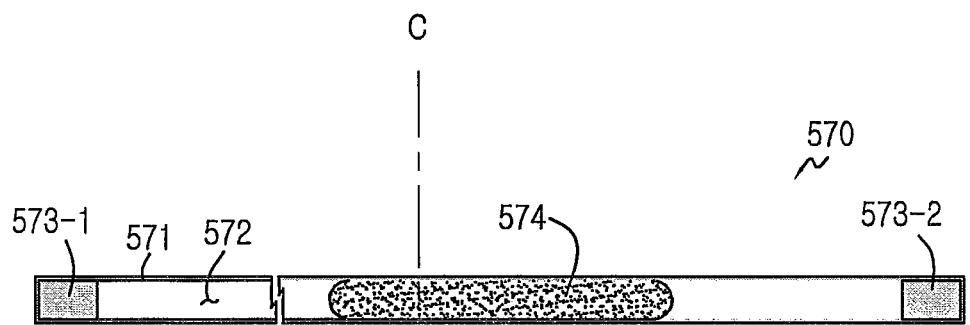
FIGS. 6A and 6B (collectively referred to as FIG. 6) illustrates a structure of a moment module according to various embodiments of the present disclosure.

Referring to FIG. 6A, a moment module 570 may include a duct 571, a pair of electromagnets 573-1 and 573-2, and a magnetic material 574. The duct 571 may include a linear passage 572 for guiding a linear movement of the magnetic material 574. The passage 572 may be disposed from a left eccentric location to a right eccentric location. The pair of electromagnets 573-1 and 573-2 may be disposed at both ends of the passage 572. The magnetic material 574 may move between the left eccentric location and the right eccentric location about a rocking center C by the use of the pair of electromagnets 573-1 and 573-2.

Figure 6B:
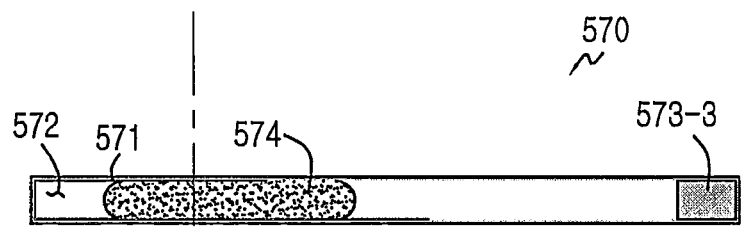

Referring to FIG. 6B, a moment module 570 includes a duct 571, one electromagnet 573-3, and a magnetic material 574. The duct 571 may include a linear passage 572 for guiding a linear movement. The passage 572 may guide the magnetic material 574 so that it moves between a rocking center C and a right eccentric location. The electromagnet 573-3 may be disposed at a right end portion of the passage 572.

Figure 7A:
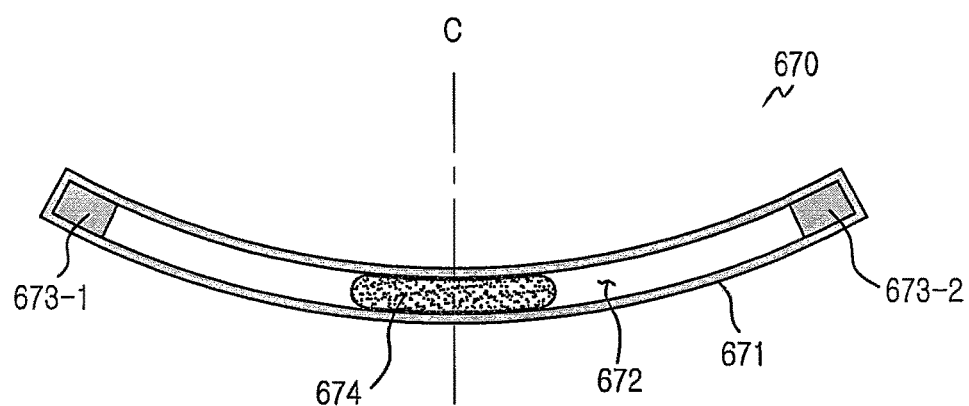
FIGS. 7A and 7B (collectively referred to as FIG. 7) illustrates a structure of a moment module according to various embodiments of the present disclosure.
Figure 7B:
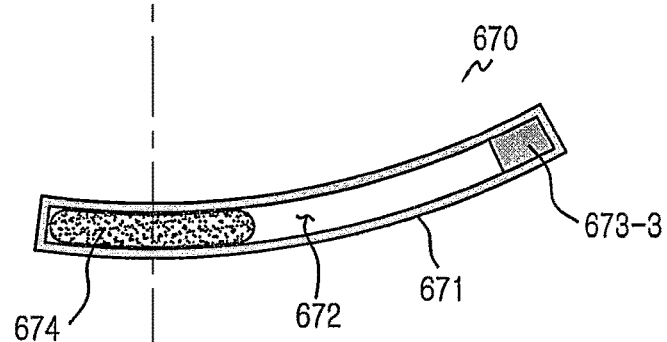

FIG. 7 illustrates a structure of a moment module according to various embodiments of the present disclosure.

Referring to FIG. 7A, a moment module 670 includes a duct 671, a pair of electromagnets 673-1 and 673-2, and a magnetic material 674. The duct 671 may include a curvilinear passage 672 for guiding a curvilinear movement. The passage 672 may be disposed from a left eccentric location to a right eccentric location. The pair of electromagnets 673-1 and 673-2 may be disposed at both ends of the passage 672. The magnetic material 674 may move between the left eccentric location and the right eccentric location about a rocking center C by the use of the pair of electromagnets 673-1 and 673-2. If an electromagnetic force from the pair of electromagnets 673-1 and 673-2 is no longer applied, the magnetic material 674 may be flexible within the passage 672, and may automatically return to a location of the rocking center C along the curvilinear passage 672.

Referring to FIG. 7,B a moment module 670 may include a duct 671, one electromagnet 673-3, and a magnetic material 674. The duct 671 may include a curvilinear passage 672 for guiding a curvilinear movement. The passage 672 guides the magnetic material 674 so that the magnetic material 674 moves between a rocking center C and a right eccentric location. The electromagnet 673-3 may be disposed at a right end portion of the passage 672. When an electromagnetic force is no longer applied in the electromagnet 673-3, the magnetic material 674 automatically returns to a location of the rocking center C along the curvilinear passage 672.

Figure 8:
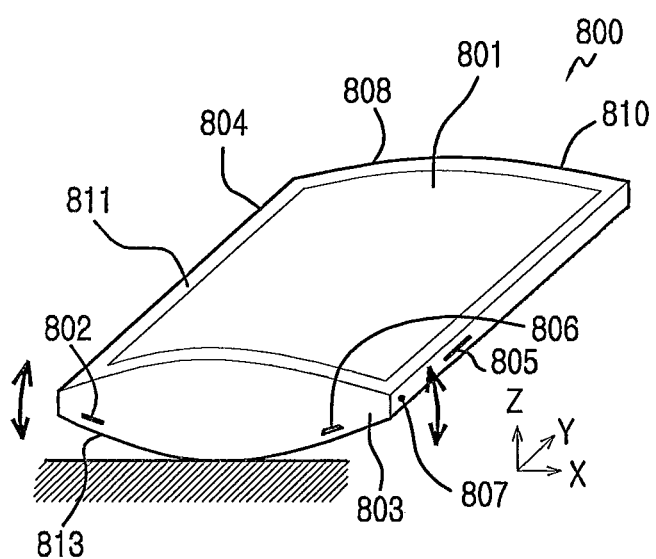
FIG. 8 is a perspective view of an electronic device according to various embodiments of the present disclosure.

FIG. 8 is a perspective view of an electronic device according to various embodiments of the present disclosure. An electronic device 800 may be the hardware 200 of FIG. 2.

Referring to FIG. 8, the electronic device 800 includes a touch screen 801, a speaker 802, at least one sensor 803, a camera 804, at least one key 805, an external port 806, a microphone 807, or a jack 808. Such elements 801, 802, 803, 804, 805, 806, 807, and 808 may perform the same roles as the elements of FIG. 4. An upper portion 811 and lower portion 813 of a housing 810 may include an outwardly convex surface. The touch screen 801 may be displayed to the upper portion 811 of the housing 810, and may have a curvilinear shape. The electronic device 800 is rockable in a left/right direction or a front/rear direction through a rolling motion using the lower portion 813 of the housing 810. In addition, the electronic device 800 is rockable in the left/right direction or the front/rear direction through a rolling motion using the upper portion 811 of the housing 810.

Figure 9:
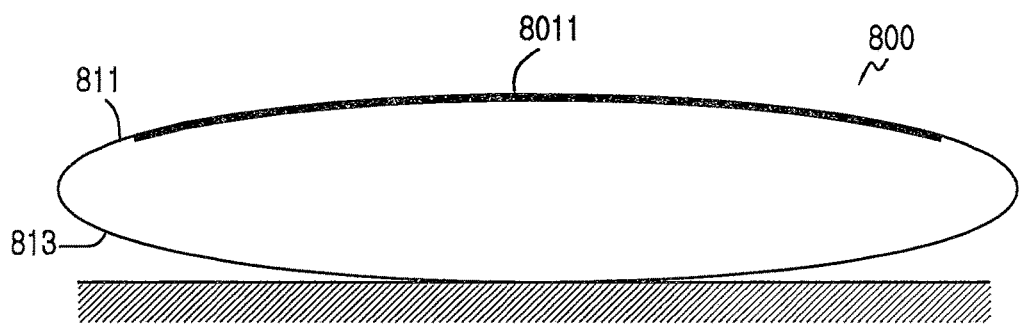
FIG. 9 and FIG. 10 illustrate a placement of a display in an electronic device according to various embodiments of the present disclosure.
Figure 10:
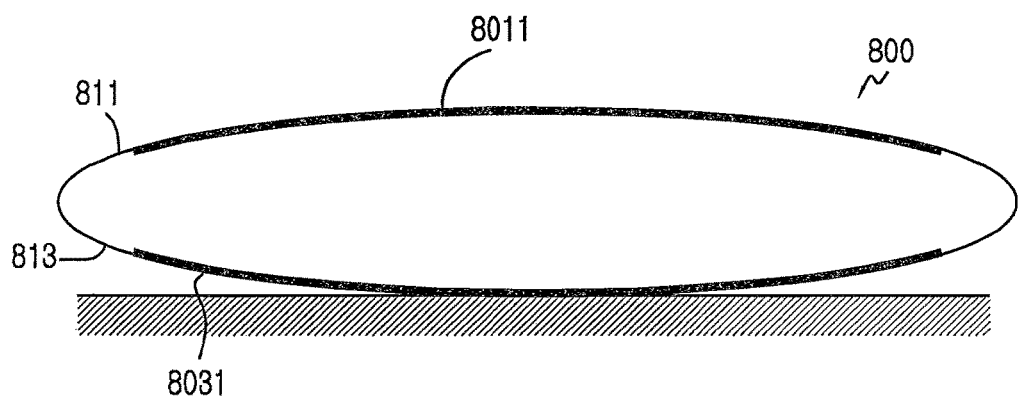

FIG. 9 and FIG. 10 illustrate a placement of a display in an electronic device according to various embodiments of the present disclosure. As described above, the electronic device 800 may include the curvilinear upper portion 811 and lower portion 813.

Referring to FIG. 9, a display 8011 (e.g., the panel 262) may be disposed to the upper portion 811 of the electronic device 800.

Referring to FIG. 10, displays 8011 and 8031 (e.g., the panel 262) may be disposed respectively to the upper portion 811 and the lower portion 813 of the electronic device 800.

FIG. 11 to FIG. 14 illustrate a placement of a moment module in an electronic device according to various embodiments of the present disclosure.

Figure 11:
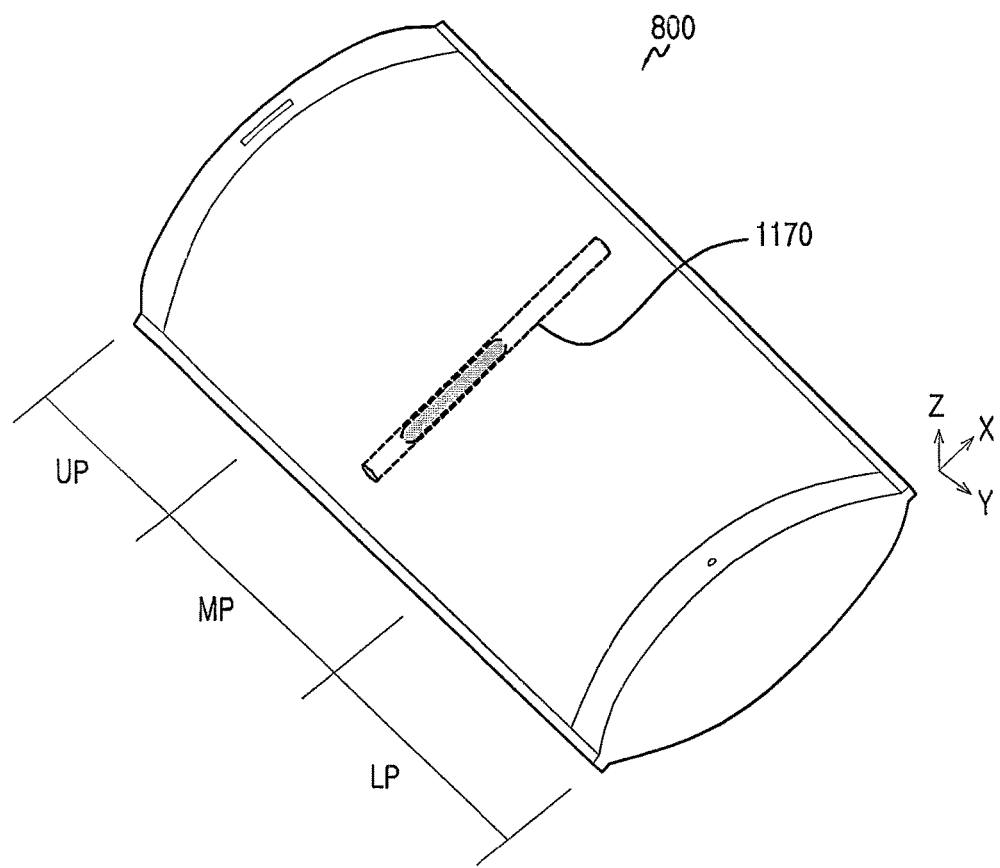
FIG. 11 to FIG. 14 illustrate a placement of a moment module in an electronic device according to various embodiments of the present disclosure.

Referring to FIG. 11, a moment module 1170 may include the moment module 570 of FIG. 6 or the moment module 670 of FIG. 7. The moment module 1170 may be disposed within a Middle Portion (MP) between an Upper Portion (UP) and a Lower Portion (LP).

Figure 12:
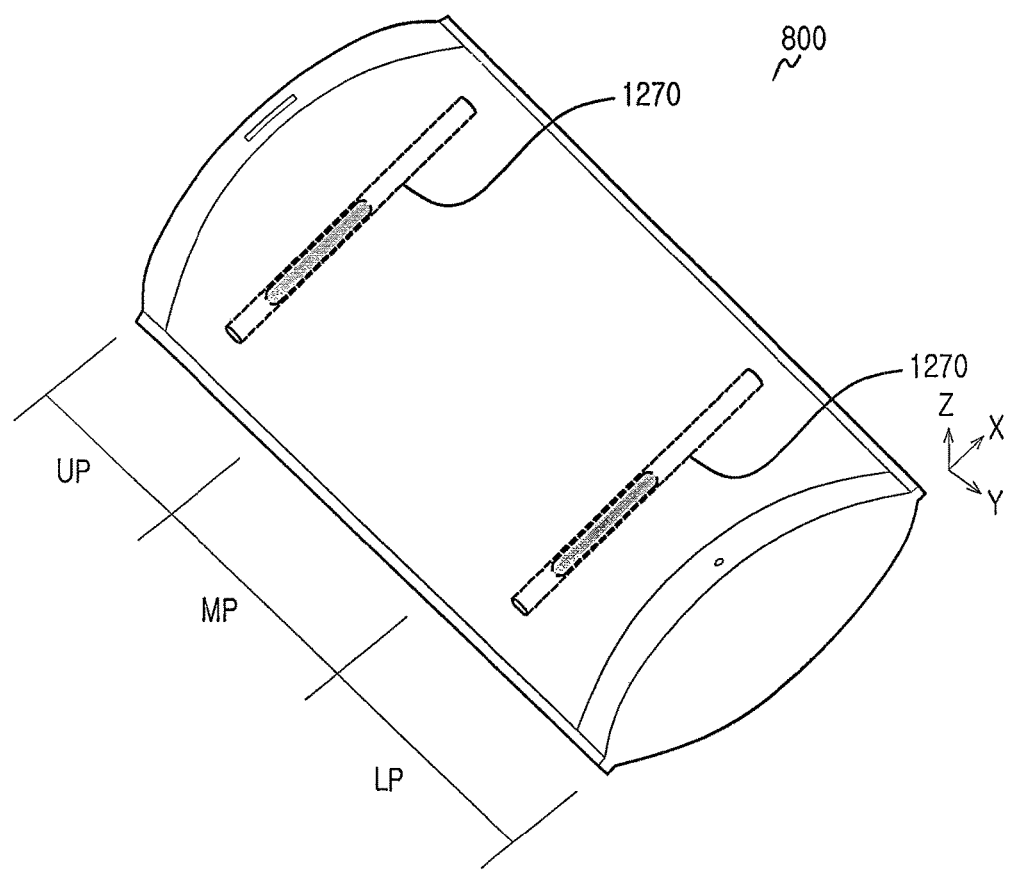

Referring to FIG. 12, a plurality of (e.g., two) moment modules 1270 may include the moment module 570 of FIG. 6 or the moment module 670 of FIG. 7. One moment module 1270 may be disposed to a UP of the electronic device 800, and the other moment module 1270 may be disposed to a LP of the electronic device 800.

Figure 13:
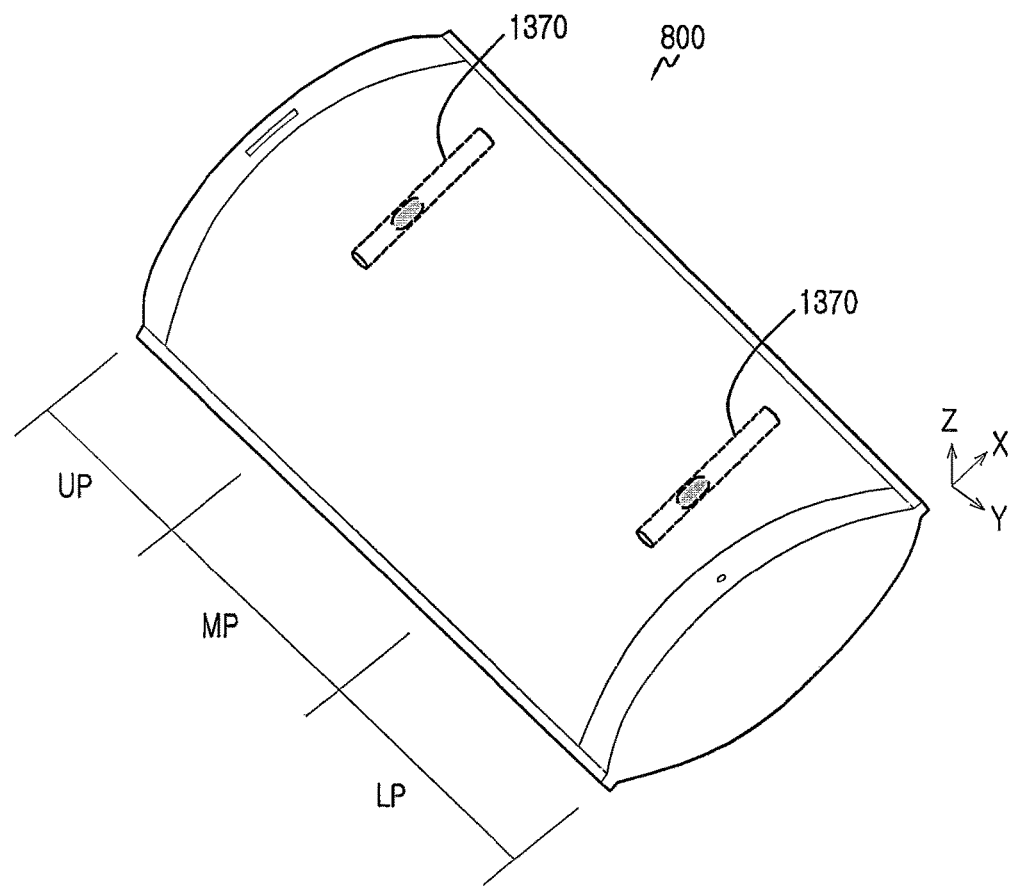

Referring to FIG. 13, a plurality of (e.g., two) moment modules 1370 may include the moment module 570 of FIG. 6 or the moment module 670 of FIG. 7. One moment module 1370 may be disposed to the right of a UP of the electronic device 800, and the other moment module 1370 may be disposed to the right of a LP of the electronic device 800.

Figure 14:
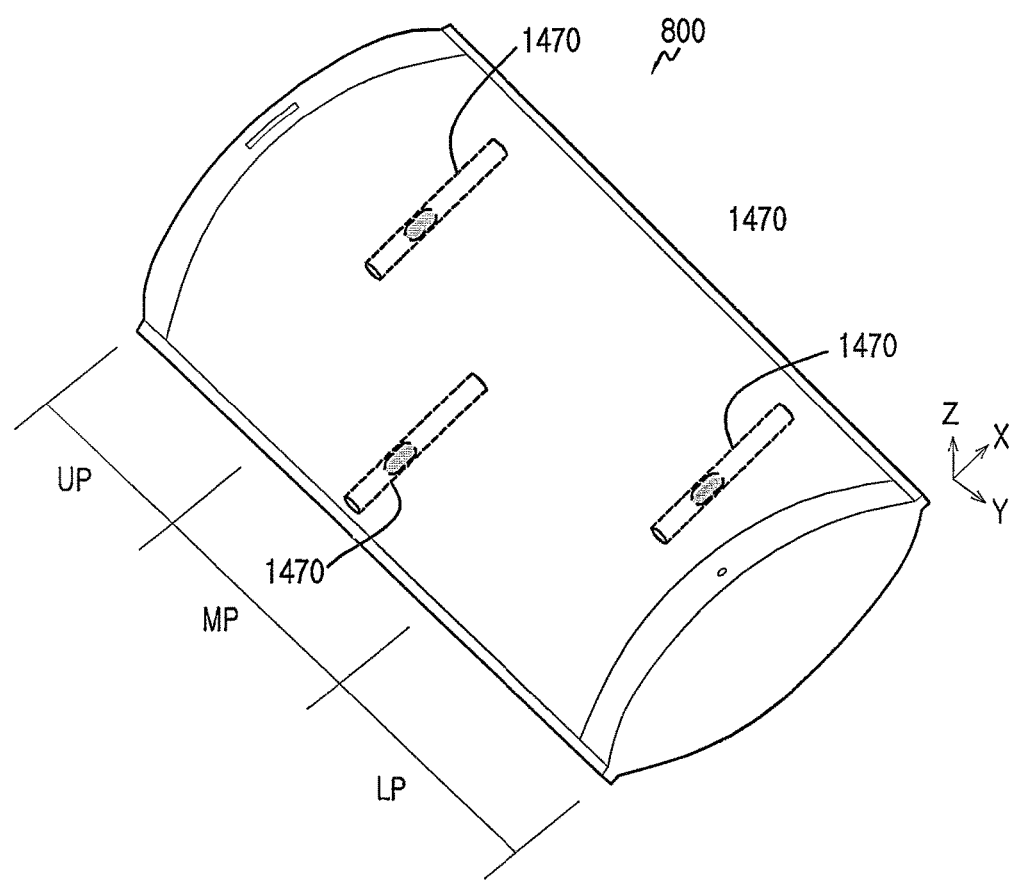

Referring to FIG. 14, a plurality of moment modules 1470 may include the moment module 570 of FIG. 6 or the moment module 670 of FIG. 7. One moment module 1470 may be disposed to the right of a UP of the electronic device 800, another moment module 1470 may be disposed to the left of a MP of the electronic device 800, and the remaining moment module 1470 may be disposed to the right of a LP of the electronic device 800.

Figure 15:
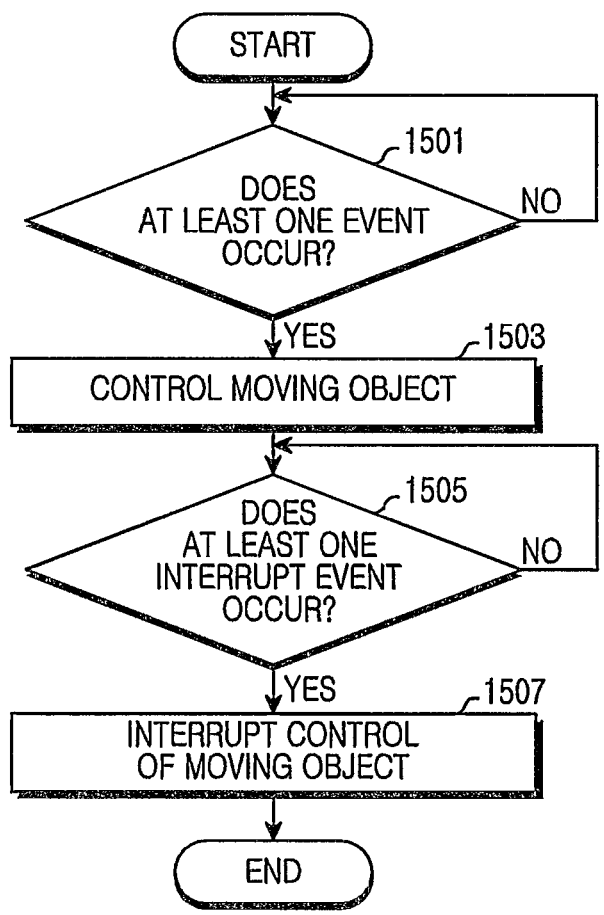
FIG. 15 illustrates a process of operating an electronic device including a curved bottom according to various embodiments of the present disclosure.

FIG. 15 illustrates a process of operating an electronic device including a curved bottom according to various embodiments of the present disclosure.

Referring to FIG. 15, in step 1501, the processor 211 identifies whether at least one event (e.g., a call reception, a message reception, a mail reception, and an arrival of a specific time (schedule or alarm)) occurs.

In step 1503, in response to the occurrence of the at least one event, the processor 211 controls a moving object (e.g., the magnetic materials 574 and 674) for triggering the rocking of the electronic device 200. The processor 211 outputs a control signal to the moment module 299 (e.g., the moment modules 570 and 670 shown in FIG. 5 to FIG. 7). In response to the control signal, the moment module 299 moves the moving object (or load object) (e.g., the magnetic materials 574 and 674) to an eccentric location, thereby triggering an eccentric load. An eccentric moment acts on the electronic device 200 due to the eccentric load, and the electronic device 200 performs a rolling motion by using a curved bottom (see 413 of FIG. 4 or 813 of FIG. 8). For another example, the processor 211 outputs to the moment module 299 a control signal for reciprocally moving the moving object between eccentric locations which are opposite to each other (e.g., a left eccentric location and a right eccentric location). The moment module 299 may alternately generate a $1^{st}$ eccentric moment and a $2^{nd}$ eccentric moment so that the electronic device 200 can perform the rolling motion in directions opposite to each other in response to the control signal. For another example, the processor 211 may output to the moment module 299 a control signal for controlling the eccentric location of the moving object. For another example, the processor 211 may output to the moment module 299 a control signal for controlling a movement speed of the moving object.

In step 1505, the processor 211 identifies whether at least one interrupt event occurs.

In step 1507, the processor 211 may interrupt a control of the moving object in response to the occurrence of the at least one interrupt event. For example, the processor 211 may not output a control signal (or electric current) to the moment module 299, and the moving object of the moment module 299 may be in a free state within a passage (see 572 of FIG. 6 or 672 of FIG. 7). The processor 211 may acquire motion data of the electronic device 200 from at least one sensor (e.g., the sensor module 240), and may recognize the occurrence of the interrupt event when the motion data satisfies a pre-set criterion. For example, if a user lifts the electronic device 200 placed on a floor, the electronic device 200 may interrupt the control of the moving object. In addition, the processor 211 may interrupt the control of the moving object when it is recognized that an object (e.g., a user's hand) is proximate thereto, by using at least one sensor (e.g., the sensor module 240). In addition, the processor 211 may interrupt the control of the moving object in response to a pre-set input (e.g., a button input, etc.) from the user input module 250.

Figure 16:
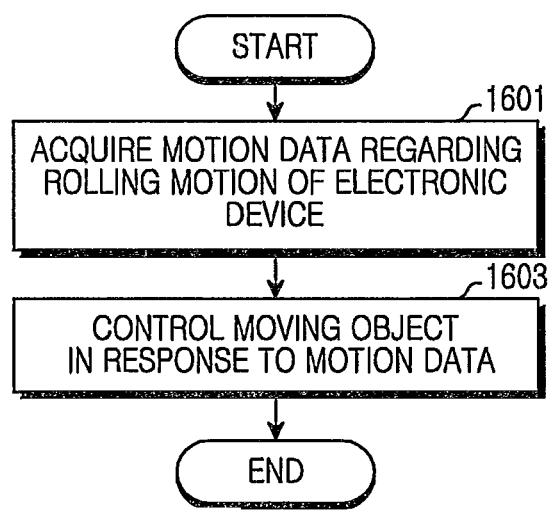
FIG. 16 illustrates a process of controlling a moving object according to various embodiments of the present disclosure.

FIG. 16 illustrates a process of controlling a moving object according to various embodiments of the present disclosure.

In step 1601, the processor 211 acquires motion data (e.g., a rotation direction, a rotation angle, a rotation speed, a movement distance, a time, an angular speed, etc.) regarding a rolling motion of the electronic device 200 from at least one sensor (e.g., the sensor module 240).

In step 1603, the processor 211 controls a moving object (e.g., the magnetic materials 574 and 674) of the moment module 299 in response to the motion data. The electronic device 200 can be rocked consistently under the moving object control of the processor 211. For example, if the electronic device 200 performs a right rolling motion such that a movement distance or a rotation angle is less than a reference value, the processor 211 may output a control signal to the moment module 299 so that the moving object moves from a right eccentric location to a left eccentric location. A control mechanism by which the moving object moves reciprocally between eccentric locations opposite to each other may provide a driving force of triggering the rocking of the electronic device 200. For another example, if the electronic device 200 performs the left or right rolling motion at a speed greater than a threshold speed, the processor 211 may output a control signal to the moment module 299 so that the moving object is placed at a proper location to prevent the electronic device 200 from being excessively rocked. Various other examples may also be possible.

Figure 17:
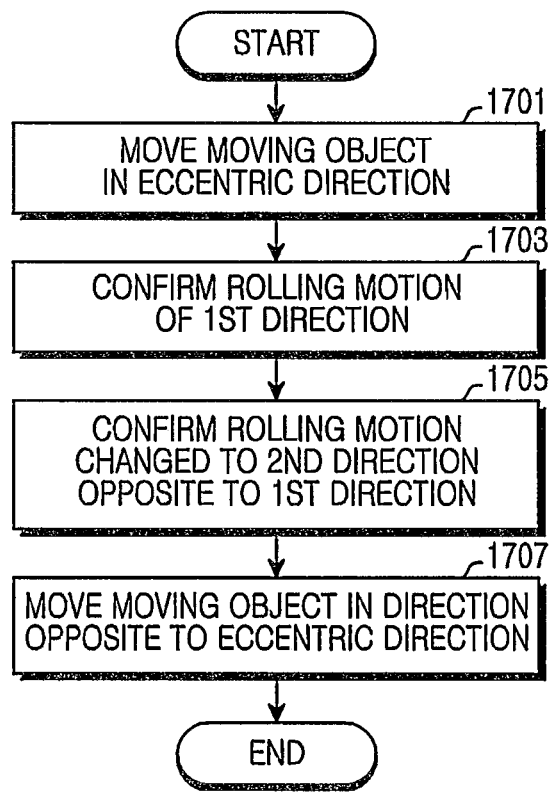
FIG. 17 illustrates a process of operating an electronic device including a curved bottom according to various embodiments of the present disclosure.

FIG. 17 illustrates a process of operating an electronic device including a curved bottom according to various embodiments of the present disclosure.

Referring to FIG. 17, in step 1701, the processor 211 moves a moving object in an eccentric direction under the control of the moment module 299.

In step 1703, the processor 211 confirms a state in which the electronic device 200 performs a rolling motion in a $1^{st}$ direction (e.g., a front, rear, left, or right direction) by using at least one sensor (e.g., the sensor module 240). The moving object may move in the eccentric direction, and an eccentric moment may be triggered. Due to the eccentric moment, the electronic device 200 may perform a rolling motion in the $1^{st}$ direction.

In step 1705, the processor 211 confirms a state in which the electronic device 200 performs a rolling motion in a $2^{nd}$ direction opposite to the $1^{st}$ direction, by using at least one sensor (e.g., the sensor module 240). The electronic device 200 may perform the rolling motion by changing a direction due to a conversion from a potential energy to a kinetic energy.

In step 1707, the processor 211 may move the moving object in a direction opposite to an eccentric direction under the control of the moment module 299.

In accordance with a first implementation of the present disclosure, the electronic device 400 may include the housing 410 forming an exterior thereof and rockable using the curved bottom, a moving object (e.g., the magnetic material 574) movable in the housing 410, a transfer means (e.g., the electromagnet 573) for moving the moving object 574 to at least one eccentric location, and a control means (e.g., the processor 211) for controlling the transfer means (e.g., the electromagnet 573).

In accordance with the first implementation of the present disclosure, the moving object is the magnetic material 574, and the transfer means includes at least one electromagnet 573 for generating an electromagnetic force exerting an attractive or repulsive force to the moving object 574.

In accordance with the first implementation of the present disclosure, the control means 211 outputs a control signal for controlling a direction of the electromagnetic force to the transfer means 573.

In accordance with the first implementation of the present disclosure, the control means 211 outputs a control signal for controlling a strength of the electromagnetic force to the transfer means 573.

In accordance with the first implementation of the present disclosure, the control means 211 outputs a control signal for controlling a time of keeping the electromagnetic force to the transfer means 573.

In accordance with the first implementation of the present disclosure, the moving object 574 may include a magnetic fluid.

In accordance with the first implementation of the present disclosure, the transfer means 573 may include the passage 572 for guiding a movement of the moving object 574.

In accordance with the first implementation of the present disclosure, the moving object 574 may move in a linear or curvilinear manner.

In accordance with the first implementation of the present disclosure, the control means 211 may output a control signal for reciprocally moving the moving object 574 to the transfer means 573.

In accordance with the first implementation of the present disclosure, the control means 211 may output a control signal for controlling the at least one eccentric location to the transfer means 573.

In accordance with the first implementation of the present disclosure, the control means 211 may output a control signal for controlling a speed of the moving object 574 to the transfer means 573.

In accordance with the first implementation of the present disclosure, at least one sensor (e.g., the sensor module 240) for acquiring motion data corresponding to a rolling motion caused by the curved bottom 413 may be included, and the control means 211 may output a control signal for controlling the transfer means 573 in response to the motion data.

In accordance with the first implementation of the present disclosure, the motion data may include at least one of a rotation direction, a rotation angle, a rotation speed, a movement distance, a time, and an angular speed.

In accordance with the first implementation of the present disclosure, the at least one sensor may include at least one of a gyro sensor, an acceleration sensor, and a geomagnetic sensor.

In accordance with the first implementation of the present disclosure, a display (e.g., the touch screen 401), disposed to the housing, for outputting an image signal from the control means may be included.

In accordance with the first implementation of the present disclosure, the display 401 may be flexible and may have a curvilinear shape.

In accordance with a second implementation of the present disclosure, a method of operating the electronic device 400 having the movable moving object 574 and the curved bottom may include sensing at least one event, and controlling the moving object 574 for triggering a rocking of the electronic device 400.

In accordance with the second implementation of the present disclosure, the controlling of the moving object 574 for triggering the rocking of the electronic device 400 may be configured to control a location or speed of the moving object 574.

In accordance with the second implementation of the present disclosure, the controlling of the moving object 574 for triggering the rocking of the electronic device 400 may be configured to trigger an eccentric moment by moving the moving object 574 to an eccentric location.

In accordance with the second implementation of the present disclosure, the controlling of the moving object 574 for triggering the rocking of the electronic device 400 may be configured to acquire motion data regarding a rolling motion of the electronic device 400 and control the moving object 574 in response to the motion data. The motion data may include at least one of a rotation direction, a rotation angle, a rotation speed, a movement distance, a time, and an angular speed.

In accordance with the second implementation of the present disclosure, the at least one event may include at least one of a call reception, a message reception, a mail reception, and an arrival of a specific time.

The various embodiments of the present disclosure may be applied to at least one application. For example, the electronic device 200 is rockable in response to at least one event generated while executing a game application, thereby providing more amusement to a user.

An electronic device is rockable by using a curved bottom in response to an occurrence of an event, thereby providing amusement to a user when announcing the event.

While the present disclosure has been particularly shown and described with reference to embodiments thereof, it will be understood by those skilled in the art that various changes in form and details may be made therein without departing from the spirit and scope of the present disclosure as defined by the appended claims.

Methods based on the embodiments disclosed in the claims and/or specification of the present disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the present disclosure.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory may be plural in number.

What is claimed is:

1. An electronic device comprising:
a housing including a curved bottom, wherein the housing is able to be rocked using the curved bottom;
a movable object arranged in the housing, the movable object configured to move in a curvilinear manner along a curvilinear passage;
a transfer means configured to move the movable object to at least one eccentric location; and
a processor configured to control the transfer means,
wherein the movable object includes a magnetic material,
wherein the transfer means includes a pair of electromagnets configured to alternately generate an electromagnetic force to move the movable object by the processor, and
wherein the pair of electromagnets are configured to be disposed at both ends of the curvilinear passage.

2. The electronic device of claim 1, wherein the processor is further configured to output a control signal that controls a direction of the electromagnetic force to the transfer means.

3. The electronic device of claim 1, wherein the processor is further configured to output a control signal that controls a strength of the electromagnetic force to the transfer means.

4. The electronic device of claim 1, wherein the processor is further configured to output a control signal that controls a time of keeping the electromagnetic force to the transfer means.

5. The electronic device of claim 1, wherein the movable object includes a magnetic fluid.

6. The electronic device of claim 1, wherein the transfer means includes a passage configured to guide a movement of the movable object.

7. The electronic device of claim 1, wherein the processor is further configured to output a control signal that controls reciprocal movement of the movable object to the transfer means.

8. The electronic device of claim 1, wherein the processor is further configured to output a control signal that controls the at least one eccentric location of the movable object to the transfer means.

9. The electronic device of claim 1, wherein the processor is further configured to output a control signal that controls a speed of the movable object to the transfer means.

10. The electronic device of claim 1, further comprising at least one sensor configured to acquire motion data corresponding to a rolling motion caused by the curved bottom, wherein the processor is further configured to output a control signal that controls the transfer means in response to the motion data.

11. The electronic device of claim 10, wherein the motion data includes at least one of a rotation direction, a rotation angle, a rotation speed, a movement distance, a time, or an angular speed.

12. The electronic device of claim 1, further comprising a display, disposed within the housing, configured to output an image signal from the processor,
wherein the display is flexible and has a curvilinear shape.

13. A method comprising:
sensing, by an electronic device having a movable object and a curved bottom, at least one event; and
in response to sensing the at least one event, controlling a movement of the movable object to trigger a rocking of the electronic device,
wherein the movable object moves in a curvilinear manner along a curvilinear passage,
wherein controlling a movement of the movable object comprises alternately generating an electromagnetic force between a pair of electromagnets, and
wherein the pair of electromagnets are configured to be disposed at both ends of the curvilinear passage.

14. The method of claim 13, wherein the controlling of the movement of the movable object to trigger the rocking of the electronic device is configured to control a location or speed of the movable object.

15. The method of claim 13,
wherein the controlling of the movement of the movable object for triggering the rocking of the electronic device is configured to acquire motion data regarding a rolling motion of the electronic device and control the movable object in response to the motion data, and
wherein the motion data includes at least one of a rotation direction, a rotation angle, a rotation speed, a movement distance, a time, or an angular speed.

16. The method of claim 13, wherein the at least one event includes at least one of a call reception, a message reception, a mail reception, or an arrival of a specific time.

* * * * *